R. F. ROGERS.
MOTOR CYCLE SIDE CAR FRAME.
APPLICATION FILED MAY 23, 1914.
1,140,069.
Patented May 18, 1915.
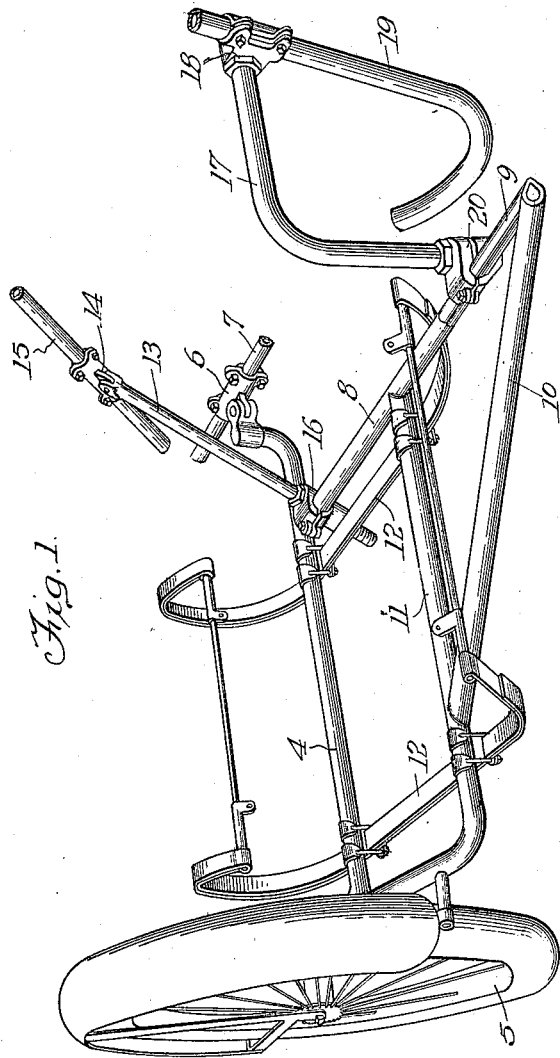
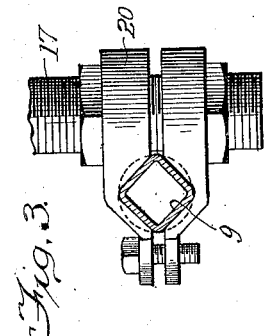
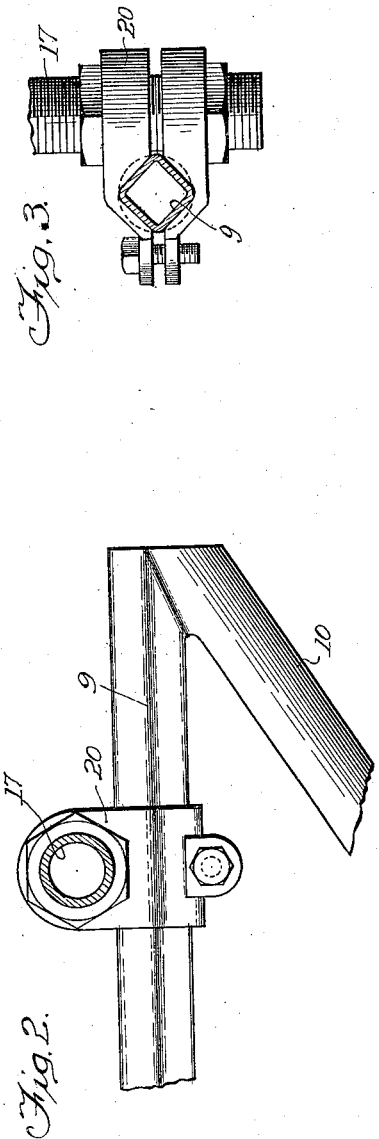
Witnesses:
Inventor
Ralph F. Rogers
By James R. Offield.
Atty.

UNITED STATES PATENT OFFICE.

RALPH F. ROGERS, OF CHICAGO, ILLINOIS.

MOTOR-CYCLE SIDE-CAR FRAME.

1,140,069.    Specification of Letters Patent.    Patented May 18, 1915.

Application filed May 23, 1914. Serial No. 840,414.

*To all whom it may concern:*

Be it known that I, RALPH F. ROGERS, a citizen of the United States, residing in the city of Chicago, in the county of Cook and State of Illinois, have invented certain new and useful Improvements in Motor-Cycle Side-Car Frames, of which the following is a specification.

In the manufacture of motorcycle side-car frames it is necessary to construct the parts from as light material as possible in order to reduce the weight of the structure. The framework may be constructed as a whole from relatively light material with the exception of one part of the frame upon which the greatest strain comes. It is essential that the side-car frame be so attached to the motorcycle frame as to be absolutely rigid and this is ordinarily accomplished by arms which extend from the motorcycle frame and which are secured to the main strain-resisting bar of the side-car frame. If the main strain-resisting bar be made solid so as to withstand the severe strain that it is subjected to, it is then too heavy, and if made hollow the twisting strain to which it is subjected where the arms from the motorcycle frame engage the same, will soon break it. Furthermore, where clamps engage a round bar they are very liable to slip and, as before stated, in motorcycle side-car constructions the parts must stay as adjusted for the proper running of the vehicle.

In designing my motorcycle side-car frame I have devised a structure wherein I have obtained lightness by using a tubular main supporting bar, but I have prevented the twisting or breaking of the main supporting bar by reinforcing it at its end in such a manner that the twisting strain would be resisted and in addition to this fact I have so formed the main supporting bar that the clamp from the arm will not turn relative to the main supporting bar under the most severe strain and at the same time the clamp may be adjusted longitudinally of the bar in order to adapt the side-car frame to different types of motorcycles.

In the accompanying drawing Figure 1 is a perspective view of my improved motorcycle-side-car frame; Fig. 2 is a detailed view of the forward end of the frame; Fig. 3 is an end view of Fig. 2.

Referring now more particularly to the drawing, my improved side-car frame consists of a rear axle member 4 upon which the wheel 5 is mounted at one end, the inner end being provided with a clamp 6 adapted to be secured to a bar 7 which is part of a motorcycle not shown herein. The main strain-resisting frame member 8 is secured to the frame member 4 at one end extending at right angles to the member 4 and the outer end of which is square, as shown at 9. At the extreme end of the member 8, the brace member 10 is welded thereto and extends rearwardly meeting the frame member 11, which lies parallel to the member 4 for a portion of its length, having one end secured to the member 8 and its other end secured to the member 4. The springs 12 are secured to the members 4 and 11. The arm 13 is provided with a clamp 14 adapted to be attached to the bar 15 which is a part of a motorcycle and the lower end carries a clamp 16 that is secured to the member 8. The arm 17 has a clamp 18 at one end whereby the same is secured to the bar 19 constituting part of the motorcycle frame. The lower end of the arm 17 carries the clamp 20, the jaws of which are so formed as to engage the squared surface 9 of the member 8. The greatest strain comes upon the arm 17 since this arm is attached to the forward portion of the motorcycle and carrying a considerable portion of the load upon the side-car frame. Furthermore, the turning or tilting of the motorcycle tends to lift or bear down upon the frame member 8 and, consequently the arm 17 and the frame member 8 must be so constructed as to withstand much greater strain than any other part of the device.

By squaring the frame member 8, or giving it any other suitable form except round, and using a clamp in connection therewith having jaw surfaces corresponding to the surface 9, twisting of the member 8 relative to the arm 17 is thereby prevented. The frame member is squared for a portion of its length in order to permit the adjustment of the clamp 20 along the same. I am enabled to use a light hollow tube for the frame member 8 by reason of the fact that the frame member 10 is welded or otherwise secured to the forward end of the member 8 and also secured to the member 11, whereby the member 8 is prevented from twisting and splitting as is the case where no supporting bar, such as 10, is used. The supporting bar 10 furthermore, gives stability to the entire frame structure and acts as a protecting medium or bar to a vehicle body that may be placed upon the frame.

Having now described my invention, I claim:

A motor-cycle side car frame comprising a main frame member having an angular surface formed at its forward end, a rear axle member, an intermediate frame member arranged parallel to said rear axle member for a portion of its length and secured to said main frame member at one end and to the rear axle member at its other end, a brace rod extending from said intermediate frame member to the forward end of said main frame member, an arm connected to said main frame member near the rear axle and an arm provided with a clamp having angular jaw surfaces for attachment to the angular surface of said main frame member.

In witness whereof, I have hereunto subscribed my name this 21st day of May, A. D. 1914.

RALPH F. ROGERS.

Witnesses:
SADIE M. RYAN,
AVIS HERRIMAN.

Copies of this patent may be obtained for five cents each, by addressing the "Commissioner of Patents, Washington, D. C."